(Model.)

J. E. HOFF.
POTATO PARER.

No. 249,726. Patented Nov. 15, 1881.

Witnesses:
Charles H. Pell
Chas. Kerr

Inventor:
Joseph E. Hoff,
by O. Drake. Att'y (Model.)
J. E. HOFF.
POTATO PARER.
No. 249,726.　　　　　　　　　Patented Nov. 15, 1881.
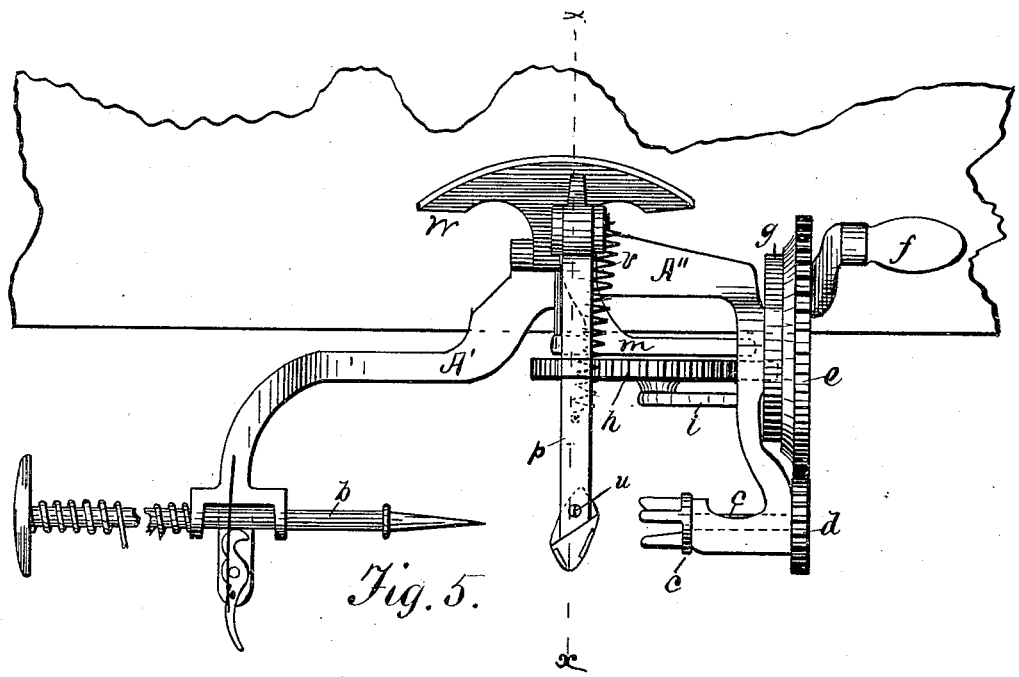
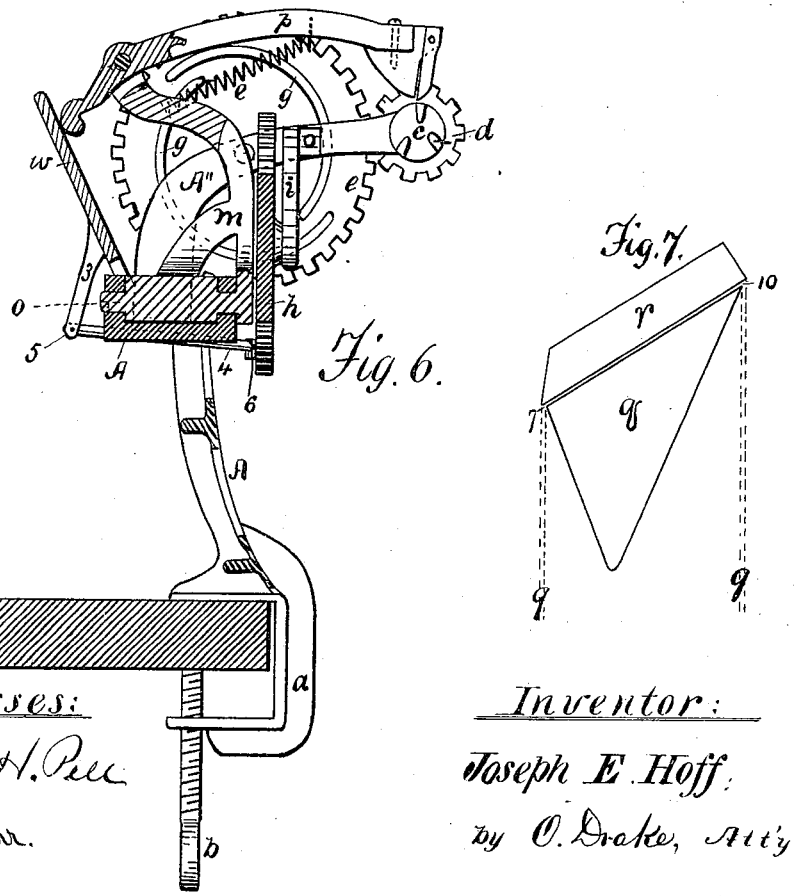
Witnesses:
Charles H. Pell
Chas. Herr
Inventor:
Joseph E. Hoff.
by O. Drake, Att'y.

(Model.)   3 Sheets—Sheet 3.

J. E. HOFF.
POTATO PARER.

No. 249,726.   Patented Nov. 15, 1881.

Witnesses:
Charles H. Pell
Chas. Kerr

Inventor:
Joseph E. Hoff,
by O. Drake, Atty.

UNITED STATES PATENT OFFICE.

JOSEPH E. HOFF, OF NEWARK, NEW JERSEY, ASSIGNOR OF ONE-HALF TO GEORGE F. STOW, OF SAME PLACE.

POTATO-PARER.

SPECIFICATION forming part of Letters Patent No. 249,726, dated November 15, 1881.

Application filed April 23, 1881. (Model.)

*To all whom it may concern:*

Be it known that I, JOSEPH ELWOOD HOFF, of Newark, in the county of Essex and State of New Jersey, have invented certain new and useful Improvements in Potato-Peelers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to pare the skins from potatoes, apples, or other like vegetables or fruits with greater facilty and more perfectly than has heretofore been done by machines for the purpose, and at the same time to remove less of the eatable portion thereof.

The invention consists in the arrangement and combination of parts, all of which will be hereinafter fully set forth, illustrated, and finally embodied in the claims.

Figure 1:
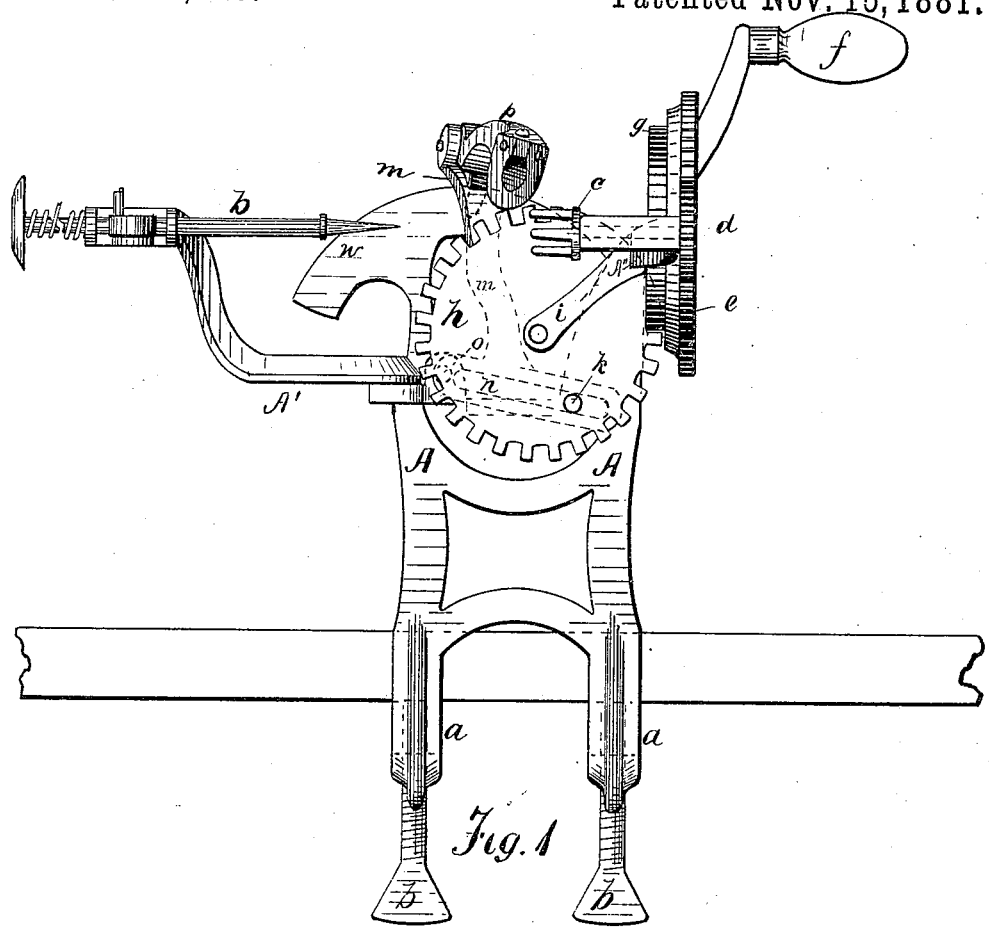
Figure 2:
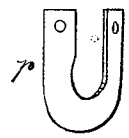
Figure 3:
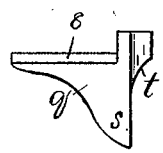
Figure 4:
Figure 9:
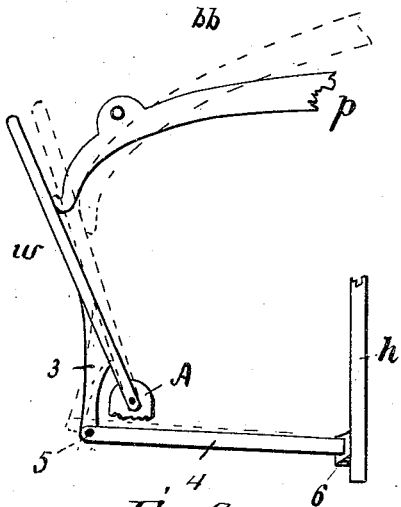
Figure 10:
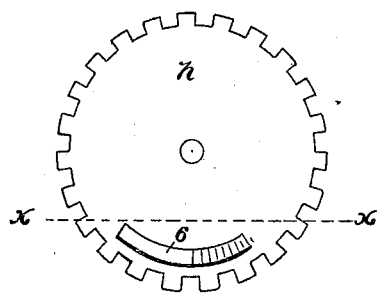

Referring to the accompanying drawings, in which similar letters and figures of reference indicate like parts in each of the several figures, Figure 1 is a front elevation, and Fig. 5 a plan view, of my device. Figs. 2, 3, and 4 are detail views of a cutter used therein. Fig. 6 is a sectional view taken through line $x$, Fig. 5. Fig. 7 is an enlarged view of the cutter, looking upward, illustrating the principles involved therein; and Figs. 8, 9, and 10 are detail views illustrating more clearly the action of the several parts.

In carrying out my invention I construct a frame, A A, having clamps $a$, with thumb-screws therein, to hold said frame rigidly upon the table, and also having formed thereon, or securely attached thereto, carrying-arms A' A'', the former carrying a spindle, $b$, and the latter, besides the several cogs hereinafter set forth, carrying a rotating trifurcated spindle, $c$, operated by a cog, $d$. Said spindles $b$ $c$ co-operate to turn the potato or other vegetable or fruit beneath the blade, as will be clearly understood. The carrying-arm A'' of the frame A acts as a bearing for the cog-wheel $e$, which has a crank, $f$, attached to its outer face, by means of which the mechanism is operated, the cog $d$ engaging with cog $e$ to turn the forked spindle $c$, and as it (cog $d$) is smaller than the said cog $e$, increased rapidity of motion is given to the spindle. The inner face of said wheel $e$ has spirals $g$ formed thereon, which engage with the cog $h$, operating at right angles to the cog $e$ upon an arm, $i$, secured upon the carrying-arm A''. Said cog $h$ has thereon a pin, $k$, which projects from its posterior face and engages with a slotted and pivoted arm, $m$, the slot therein being lettered $n$, Fig. 1, and the pivot upon which the said arm turns being lettered $o$, Figs. 1 and 6. As the pin revolves with the cog $h$ it causes the arm $m$ to vibrate laterally upon the pivot $n$, as will be apparent. This vibratory movement is communicated to a cutter-carrying arm, $p$, pivoted upon the upper extremity of the arm $m$, which in turn causes the cutter to pass laterally over the surface of the potato and return. The cutter-carrying arm is adapted, by being grooved and perforated at and near its anterior extremity, and by having its said extremity beveled, as shown in Fig. 5, to receive a cutter which forms an especial feature of improvement. Said cutter is composed of a guard, $q$, of a peculiar conformation, which will be described, and a cutter, $r$, which may either be rigidly or adjustably secured to the guard. Said guard has a downwardly-projecting nose, $s$, forward of which is secured the cutter $r$, which projects below said nose to the extent of the desired thickness of the paring. The blade or cutter forms a loop, as shown in Figs. 1 and 2, the cutting-edge thereof being rounded, and thus adapted to pass into the eyes of the potato and other superficial irregularities thereon. The front of the looped cutter being open, the paring of the potato passes therethrough without clogging, the guard being upwardly and forwardly curved, as at $t$, to facilitate said passage and guide the paring forward, so as that it will fall upon the floor free from the machine.

The looped knife is so adjusted upon the guard or in relation to the potato as not to present an edge at right angles to the direction of cutting. The looped knife is so adjusted upon the guard as to present to the potato a cutting-edge diagonal to the direction of revolution of said potato, this arrangement being illustrated by Fig. 8, in which $a$ $a$ represent a potato revolving with and upon the trifurcated spindle c, the arrow 1 indicating the direction of revolution, and b b a paring formed by the edge of the blade passing over the revolving potato.

Figure 8:
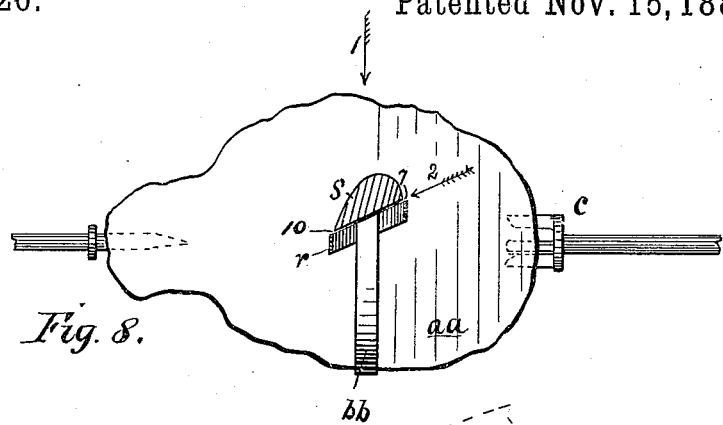

Arrow 2, Fig. 8, indicates the direction in which the dirt or other matter which might clog the blade tends to pass from the cutter, the distance between the cutting-edge of the blade r and the guard q being greatest at 10, as before set forth.

The upper portion of the guard has a ridge, 8, thereon, which engages with a groove in the carrier, by which the said guard is held in proper position for peeling, and means for securing the guard are provided—such, for example, as the screw w.

A spring, v, is secured to the cutter-carrier, adapted to hold the cutter against the potato and allow the same to rise over protuberances.

The carrier and cutter thereon, by means of a system of levers and incline 6 upon cog h, are caused to rise from the potato after the same is peeled, and continue so raised during the return motion of the carrier p, as illustrated by Figs. 9 and 10. Said carrier p, which is in itself a lever, extends backward and downward, as shown more particularly in Fig. 6, and engages with a plate, w, having a face equal in width to the distance of lateral action of the cutter-carrier. Said plate w is pivoted upon the frame A, and by means of projecting arm 3 and rod 4, pivoted thereon, is actuated by the cog-wheel h, which has an incline, 6, upon its inner face, in such a position and of such a length as that when it becomes necessary to raise the cutter the said rod 4 engages with said incline or cam 6 and throws the plate w forward, which in turn causes the levered cutter-carrier to rise and so remain while upon said cam or incline 6. However, I do not wish to confine myself to the exact method of raising the cutter-carrier p herein described.

The spindle b, and the mechanism for rendering the same effective, is to a certain extent old, and therefore I do not wish to lay especial claim to it.

Having thus described my invention, what I claim, and wish to secure by Letters Patent, is—

1. In combination, a cranked cog-wheel engaging with means adapted to rotate the potato, &c., and having spirals upon the side thereof, a cog, h, engaging with said spirals, having a pin, k, working in a slotted and pivoted arm, m, said arm m, a levered cutter-carrier, p, fulcrumed upon said arm and engaging with a plate, w, arranged and adapted to cause the cutter to rise from the potato, &c., after the same is peeled, substantially as and for the purposes set forth and shown.

2. In combination with the cutter-carrier of a parer, the plate w, having a face equal in width to the distance of lateral action of the cutter-carrier actuated by means of a cam or incline, 6, upon the cog h, the action of said cam being transmitted to said plate by intervening parts 4, 5, and 3, all the parts being arranged and operating substantially as and for the purposes set forth and shown.

3. The cutter-carrier fulcrumed upon a pivoted and slotted arm, having a cutter adjusted diagonally thereon and engaging with a plate, w, equal in width to the lateral play of said carrier, substantially as and for the purposes set forth and shown.

4. In combination, in a parer, a pivoted arm, m, having a lateral action, a cutter-carrier fulcrumed thereon, having a vertical action, a guard having a nose, s, and a looped cutter adjusted diagonally on said guard, said parts being arranged and operating substantially as set forth and shown.

5. In a parer, the guard having a rounded nose, s, adapted to slide upon the potato and into the irregularities thereof, and having a curved portion, t, adapted to guide the parings from the machine, in combination with the looped blade r, so arranged in relation to said guard as to have the space between them widen, substantially as and for the purposes set forth and shown.

In testimony that I claim the foregoing I have hereunto set my hand this 1st day of February, 1881.

JOSEPH ELWOOD HOFF.

Witnesses:
OLIVER DRAKE,
GEORGE F. STOW.